United States Patent
Drapala et al.

(10) Patent No.: US 8,375,155 B2
(45) Date of Patent: Feb. 12, 2013

(54) MANAGING CONCURRENT SERIALIZED INTERRUPT BROADCAST COMMANDS IN A MULTI-NODE, SYMMETRIC MULTIPROCESSING COMPUTER

(75) Inventors: Garrett M. Drapala, Poughkeepsie, NY (US); Christine C. Jones, Poughkeepsie, NY (US); Pak-Kin Mak, Poughkeepsie, NY (US); Craig R. Walters, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 12/821,752

(22) Filed: Jun. 23, 2010

(65) Prior Publication Data

US 2011/0320665 A1 Dec. 29, 2011

(51) Int. Cl.
*G06F 13/24* (2006.01)
(52) U.S. Cl. ......... 710/263; 710/260; 710/264; 370/412
(58) Field of Classification Search .......... 710/260–269; 370/412, 413, 503
See application file for complete search history.

(56) References Cited

U.S. PATENT DOCUMENTS

| | | | | |
|---|---|---|---|---|
| 5,379,434 A * | 1/1995 | DiBrino | | 710/264 |
| 5,475,854 A * | 12/1995 | Thomsen et al. | | 710/23 |
| 5,768,598 A * | 6/1998 | Marisetty et al. | | 710/260 |
| 5,790,871 A * | 8/1998 | Qureshi et al. | | 710/260 |
| 5,894,583 A * | 4/1999 | Johnson et al. | | 710/48 |
| 5,901,321 A * | 5/1999 | Kim et al. | | 710/264 |
| 5,951,669 A * | 9/1999 | Bailey et al. | | 710/260 |
| 6,256,677 B1 * | 7/2001 | Pribnow et al. | | 709/250 |
| 6,606,676 B1 * | 8/2003 | Deshpande et al. | | 710/262 |
| 7,080,178 B2 * | 7/2006 | Kimelman et al. | | 710/264 |
| 7,240,137 B2 * | 7/2007 | Aguilar et al. | | 710/269 |
| 7,805,556 B2 * | 9/2010 | Hagita | | 710/262 |
| 7,836,195 B2 * | 11/2010 | Veal et al. | | 709/231 |
| 2003/0133465 A1 * | 7/2003 | Alfano | | 370/412 |
| 2005/0165990 A1 * | 7/2005 | Kuki et al. | | 710/260 |
| 2006/0149878 A1 * | 7/2006 | Carmichael et al. | | 710/263 |
| 2010/0058101 A1 | 3/2010 | Shahid et al. | | |
| 2010/0070740 A1 | 3/2010 | Allen et al. | | |

OTHER PUBLICATIONS

Wells et al. Serializing Instructions in System-Intensive Workloads: Amdahl's Law Strikes Again. IEEE. 2008.*
Moudgill et al. Precise Interrupts. IEEE. 1996.*
Smith et al. Implementing Precise Interrupts in Pipelined Processors. IEEE Transactions on Computers. vol. 37. No. 5. May 1988.*

* cited by examiner

*Primary Examiner* — Matthew D Spittle
(74) *Attorney, Agent, or Firm* — H. Barrett Spraggins; John E. Campbell; Biggers & Ohanian, LLP (57) ABSTRACT

Managing concurrent serialized interrupt broadcast commands in a multi-node, symmetric multiprocessing computer including receiving, by a communications adapter in a compute node, a plurality of serialized interrupt broadcast commands; receiving, by the communications adapter, a plurality of interrupt tags for the plurality of serialized interrupt broadcast commands, each interrupt tag including an identification of an interrupt service order for a serialized interrupt broadcast command; assigning, by the communications adapter, to each serialized interrupt broadcast command its interrupt tag; and if an interrupt tag assigned to a serialized interrupt broadcast command has an interrupt service order that matches a value of a current operation tag that identifies the next serialized interrupt broadcast command to be exposed to the one or more processors, exposing, by the communications adapter, the serialized interrupt broadcast command to the one or more processors on the compute node to be serviced.

18 Claims, 5 Drawing Sheets

MANAGING CONCURRENT SERIALIZED INTERRUPT BROADCAST COMMANDS IN A MULTI-NODE, SYMMETRIC MULTIPROCESSING COMPUTER

BACKGROUND OF THE INVENTION

1. Field of the Invention

The field of the invention is data processing, or, more specifically, methods, apparatus, and products for managing concurrent serialized interrupt broadcast commands in a multi-node, symmetric multiprocessing computer.

2. Description of Related Art

Contemporary high performance computer systems, such as, for example, the IBM System z series of mainframes, are typically implemented as multi-node, symmetric multiprocessing ('SMP') computers with many compute nodes. SMP is a multiprocessor computer hardware architecture where two or more, typically many more, identical processors are connected to a single shared main memory and controlled by a single operating system. Most multiprocessor systems today use an SMP architecture. In the case of multi-core processors, the SMP architecture applies to the cores, treating them as separate processors. Processors may be interconnected using buses, crossbar switches, mesh networks, and the like. Each compute node typically includes a number of processors, each of which has at least some local memory, at least some of which is accelerated with cache memory. The cache memory can be local to each processor, local to a compute node shared across more than one processor, or shared across nodes.

Conventional SMP computers typically include inter-processor communications to facilitate the coordination of interrupt processing amongst processors. In such conventional SMP computers, there exists a network between compute nodes and their processors to broadcast commands to execute such interrupt processing. These broadcast commands for interrupt processing must be serviced by at least one processor on each node in the serial order in which these commands they were broadcast. There is, however, no requirement that these commands be serviced simultaneously. To ensure that these broadcast commands are serviced by at least one processor in each node in serial order, conventional SMP computers reject all other broadcast commands for interrupt processing while any such command is being serviced by any of the nodes. Such rejection continues until each node confirms that it has completed servicing the last broadcast command for interrupt processing and is ready to execute another such command. As the number of processors and compute nodes in SMP computers continues to increase, the volume of such broadcast commands for interrupt processing also increases and therefore the latency caused by rejecting all broadcasts while currently servicing interrupt processing also increases.

SUMMARY OF THE INVENTION

Methods, computers, and computer program products are provided for managing concurrent serialized interrupt broadcast commands in a multi-node, symmetric multiprocessing computer including receiving, by a communications adapter in a compute node, a plurality of serialized interrupt broadcast commands; receiving, by the communications adapter, a plurality of interrupt tags for the plurality of serialized interrupt broadcast commands, each interrupt tag including an identification of an interrupt service order for a serialized interrupt broadcast command; assigning, by the communications adapter, to each serialized interrupt broadcast command its interrupt tag; and if an interrupt tag assigned to a serialized interrupt broadcast command has an interrupt service order that matches a value of a current operation tag that identifies the next serialized interrupt broadcast command to be exposed to the one or more processors, exposing, by the communications adapter, the serialized interrupt broadcast command to the one or more processors on the compute node to be serviced.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
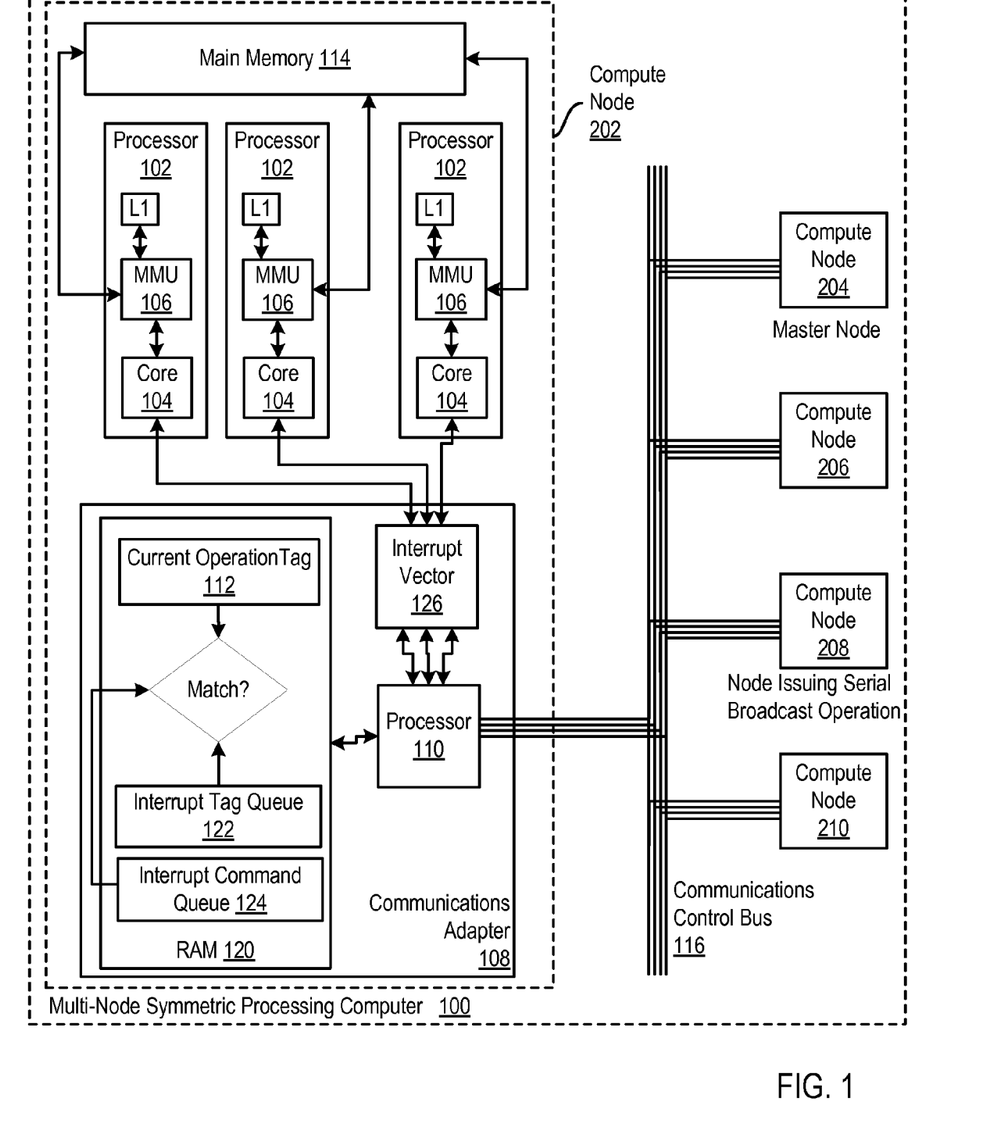
FIG. 1 sets forth a functional block diagram of an example of a multi-node, symmetric multiprocessing computer that manages concurrent serialized interrupt broadcast commands in a multi-node, symmetric multiprocessing computer according to embodiments of the present invention.

Example methods, apparatus, and computer program products for managing concurrent serialized interrupt broadcast commands in a multi-node, symmetric multiprocessing computer according to embodiments of the present invention are described with reference to the accompanying drawings, beginning with FIG. 1. FIG. 1 sets forth a functional block diagram of an example of a multi-node, symmetric multiprocessing computer (100) that manages concurrent serialized interrupt broadcast commands in a multi-node, symmetric multiprocessing ('SMP') computer according to embodiments of the present invention. A serialized interrupt broadcast command as that term is used in this specification is a command that is broadcast by a compute node in the SMP to all other compute nodes in the SMP instructing those compute nodes to interrupt one or more of the processors on the compute nodes to service the command. Such serialized interrupt broadcast command typically instruct a receiving compute node to set or clear interrupt vectors observed by one or more processors on the compute nodes. Setting and clearing such interrupt vectors often indicates the type of work to be executed by the processor servicing the interrupt and often indicates to a processor that work for that processor has either been added to a shared work queue or that work has been removed or processed from the shared work queue by another processor on the compute node. In the SMP computer of FIG. 1, more than one processor may observe and service the same interrupt identified by the interrupt vector. Examples of serialized interrupt broadcast commands include IBM's zSeries SIGI (Signal I/O Interruption) Enqueue and Dequeue. SIGI Enqueue is a command broadcast to each compute node instructing the compute node to set an interrupt vector notifying the processors that work in a shared queue is to be performed and SIGI Dequeue is a command broadcast to each node on the SMP instructing the compute node to clear an interrupt vector on each compute node. Further examples of serialized interrupt broadcast commands include system quiesce commands which include a command to set an interrupt vector to pause activity on all processors or to resume activity on paused processors.

The example computer (100) of FIG. 1 includes several compute nodes (202, 204, 206, 208, 210). Actually the example of FIG. 1 illustrates a computer (100) with five compute nodes, but this number five is only for ease of explanation, not for limitation of the invention. Readers will recognize that SMP computers that manage concurrent serialized interrupt broadcast commands according to embodiments of the present invention can have any number of compute nodes. The IBM System z10™ series of mainframe computers, for example, each can include up to 64 compute nodes or, in z10 terminology, "frames." The IBM Blue Gene™ series of supercomputers can support thousands of compute nodes.

The diagram of one of the compute nodes (202) is expanded to illustrate the structure and components typical to all of the compute nodes. Each compute node includes a number of computer processors (102). The number of computer processors per compute node is illustrated here as three, but this is for ease of explanation, not for limitation. Readers will recognize that each compute node can include any number of computer processors as may occur to those of skill in the art. The compute nodes in the IBM System z10 series of mainframe computers, for example, each can include up to 64 processors.

Each processor (102) in the example of FIG. 1 includes a compute core (104) that is coupled for memory operations through a memory management unit ('MMU') (106) and a cache controller (110) to two caches L1 and L2, and to main memory (114). L1 is a relatively small, high speed cache fabricated into the processor itself. The MMU (106) includes address translation logic, a translation lookaside buffer, controls for the on-processor cache L1, and so on.

The main memory (114) is the principal, random access store of program data and program instructions for data processing on the computer (100). In this example, main memory (114) represents a single extent of physical address space, but main memory is physically segmented and distributed across compute nodes, so that a main memory access from a processor on one compute to a main memory segment on the same node has smaller latency than an access to a segment of main memory on another compute node. Main memory can be implemented off-node entirely in a single, non-segmented set, separately from processors on nodes exclusively dedicated to main memory, and in other ways as will occur to those of skill in the art.

The communications adapter (108) of FIG. 1 is a module of automated computing machinery that manages concurrent serialized interrupt broadcast commands according to embodiments of the present invention. The communications adapter of FIG. 1 may be implemented entirely in hardware, software, or a combination of hardware and software. The communications adapter of FIG. 1 is generally capable of receiving a plurality of serialized interrupt broadcast commands; receiving a plurality of interrupt tags for the plurality of serialized interrupt broadcast commands, each interrupt tag including an identification of an interrupt service order for a serialized interrupt broadcast command; assigning to each serialized interrupt broadcast command its interrupt tag; and if an interrupt tag assigned to a serialized interrupt broadcast command has an interrupt service order that matches a current operation tag that identifies the next serialized interrupt broadcast command to be exposed to the one or more processors, exposing, by the communications adapter, the serialized interrupt broadcast command to the one or more processors on the compute node to be serviced.

In the example of FIG. 1, interrupt tags are issued only by a master node for each serialized interrupt broadcast command regardless of which node issued the serialized interrupt broadcast command and each interrupt tag has an identification of an interrupt service order for a serialized interrupt broadcast command. Each compute node in the example of FIG. 1 maintains a current operation tag (112) that includes a value that identifies the next serialized interrupt broadcast command to be exposed to a processor for servicing. Each node does not expose a serialized interrupt broadcast command to a processor for servicing unless the serialized interrupt broadcast command has an interrupt tag with an identification of an interrupt service order that matches a value of the current operation tag. Managing concurrent serialized interrupt broadcast commands according to the present inventions allows for servicing serialized interrupt broadcast commands in the correct order regardless of the order in which they are received in by each compute node.

A processor on any of the compute nodes (202, 204, 206, 208, 210) in the example of FIG. 1 may issue a serialized interrupt broadcast command and only the node assigned as the master node (204) may generate and broadcast an interrupt tag for that serialized interrupt broadcast. In the example of FIG. 1, a processor on compute node (208) issues a serialized interrupt broadcast command and the communications adapter on that compute node (208) determines whether that compute node has been assigned as a master node for issuing interrupt tags. A master node is a node in the SMP assigned to generate and broadcast to all other nodes interrupt tags used to manage concurrent serialized interrupt broadcast commands according to embodiments of the present invention. An interrupt tag is a data structure that includes an identification of a position in interrupt service order for the serialized interrupt broadcast command and an identification of at least the node that issued the serialized interrupt broadcast command for the interrupt tag. The position in interrupt service order of the interrupt tag is used to ensure that all the compute nodes (202, 204, 206, 208, 210) receiving serialized interrupt broadcast commands service those serialized interrupt broadcast commands in the proper order without regard to the order in which those commands are received.

The node assigned as the master node generates and broadcasts to all nodes interrupt tags for each serialized interrupt broadcast and assigns to each interrupt tag a position in an in interrupt service order. The assigned positions in the interrupt service order cycle in a predetermined manner known to all the nodes. Upon generating and broadcasting an interrupt tag for a serialized interrupt broadcast command the master node increments the position in the interrupt service order.

Each node (202, 204, 206, 208, 210) also maintains a current operation tag (112) that has a value that identifies the next serialized interrupt broadcast command to be exposed to a processor on the compute node and the value of the current operation tag cycle in the same manner as the positions in the interrupt service order. Upon exposing a serialized interrupt broadcast command to one or more processors on the compute node for servicing, the value of the current operation tag is incremented in exactly the same way that the positions in interrupt service order of the interrupt tags are incremented by the master node.

In the example of FIG. 1, the processor on compute node (208) that issued the serialized interrupt broadcast command is not assigned as the master node. In the example of FIG. 1, compute node (204) has been assigned as the master node. The communications adapter on compute node (208) broadcasts to all compute nodes (202, 204, 206, 208, 210) the serialized interrupt broadcast command and upon receiving a serialized interrupt broadcast command each node (202, 204, 206, 208, 210) enqueues the serialized interrupt broadcast command in an interrupt command queue (124) until an interrupt tag is received from the master node that is generated and issued for that serialized interrupt broadcast command.

In the example of FIG. 1, responsive to receiving a serialized interrupt broadcast command issued on another node the communications adapter on compute node (204) determines that it has been assigned as the master node (204) and generates an interrupt tag for the serialized interrupt broadcast command and broadcasts to all other nodes the interrupt tag. As mentioned, the interrupt tag includes an identification of a next position in an interrupt service order for the serialized interrupt broadcast command and an identification of the node that issued the serialized interrupt broadcast command for the interrupt tag. The interrupt tag only identifies the compute node that issued the serialized interrupt broadcast command in embodiments that restrict compute nodes from issuing a new serialized interrupt broadcast command before the serialized interrupt broadcast command last issued by that compute node has been serviced on each compute node. In embodiments where there is no such restriction, interrupt tags may also include a serialized interrupt broadcast command identification that uniquely identifies that particular serialized interrupt broadcast command.

In still other embodiments, compute nodes may also have no restriction from issuing a new serialized interrupt broadcast command before the serialized interrupt broadcast command last issued by that compute node has been serviced on each compute node, and in such embodiments, interrupt tags may be implemented without a unique identification of the particular serialized interrupt broadcast command. Such embodiments include creating an interrupt command queue on every node for all other nodes in the SMP. Such an interrupt command queue for each node allows serialized interrupt broadcast commands to be enqueued and matched with interrupt tags based on the originating node rather than a unique identification of each serialized interrupt broadcast command if compute nodes launch commands to all other nodes in the same order.

In the example of FIG. 1, the communication adapter (108) of FIG. 1 may receive serialized interrupt broadcast commands in any order. Upon receiving a serialized interrupt broadcast command, the communication adapter (108) enqueues the serialized interrupt broadcast command in an interrupt command queue (124) for servicing by one or more processors (102) on the compute node (202). The communication adapter (108) of FIG. 1 on each node also receives a plurality of interrupt tags for the plurality of serialized interrupt broadcast commands and may receive the interrupt tags in any order. The communication adapter (108) of FIG. 1 determines, for each received interrupt tag, whether the interrupt tag was issued for a serialized interrupt broadcast command in the interrupt command queue (124). If the received interrupt tag was issued for a serialized interrupt broadcast command in the queue, the communication adapter (108) assigns to that enqueued serialized interrupt broadcast command its interrupt tag. If the received interrupt tag was not issued for a serialized interrupt broadcast command in the queue (124) the communications adapter (108) enqueues the interrupt tag in an interrupt tag queue (122) until the communication adapter receives the serialized interrupt broadcast command for that enqueued interrupt tag.

The communications adapter (108) of FIG. 1 determines whether an interrupt tag assigned to a serialized interrupt broadcast command has an interrupt service order that matches a value of a current operation tag (112). A current operation tag includes a value that identifies the next serialized interrupt broadcast command to be exposed to the one or more processors on the compute node (202) for servicing. The current operation tag is maintained by the communications adapter of each compute node (202, 204, 206, 208, 210) and the value of the current operation tag is iterated according to the same cycle used by the master node in generating interrupt tags. Coordination of the interrupt tags and the current operation tags by each compute node ensures that serialized interrupt broadcast commands are serviced in the proper order.

If an interrupt tag assigned to a serialized interrupt broadcast command has an interrupt service order that matches a value of a current operation tag that identifies the next serialized interrupt broadcast command to be exposed to the one or more processors, the communications adapter (108) exposes the serialized interrupt broadcast command to the one or more processors (102) on the compute node to service the interrupt. In the example of FIG. 1, the communications adapter (102) exposes the serialized interrupt broadcast command to the one or more processors (102) on the compute node to be serviced by setting an interrupt vector (126) to a value for the serialized interrupt broadcast command. In the example of FIG. 1, each of the processors (102) is capable of observing the interrupt vector (126) and, upon observation of a value of the vector identifying a serialized interrupt broadcast command, each of the processors may service the serialized interrupt broadcast command.

If no interrupt tag assigned to a serialized interrupt broadcast commands matches a value of a current operation tag, the communications adapter (108) withholds all serialized interrupt broadcast commands from the one or more processor (102) until an interrupt tag assigned to a serialized interrupt broadcast commands matches a value of current operation tag. The communications adapter thereby ensures that serialized interrupt broadcast commands are serviced by the processors in the correct order.

In the example of FIG. 1, the compute node (208) that issues the serialized interrupt broadcast command is not the compute node (204) that is assigned as the master node. If the compute node (204) assigned as the master node issues the serialized interrupt broadcast command, that master compute node also broadcasts to all other compute nodes (202, 206, 208, 210) the serialized interrupt broadcast command and also generates an interrupt tag for the serial broadcast operation and broadcasts to all other compute nodes (202, 206, 208, 210) the interrupt tag. In some embodiments, the serialized interrupt broadcast command and the interrupt tag may be broadcast by the master node in a single broadcast.

Figure 2:
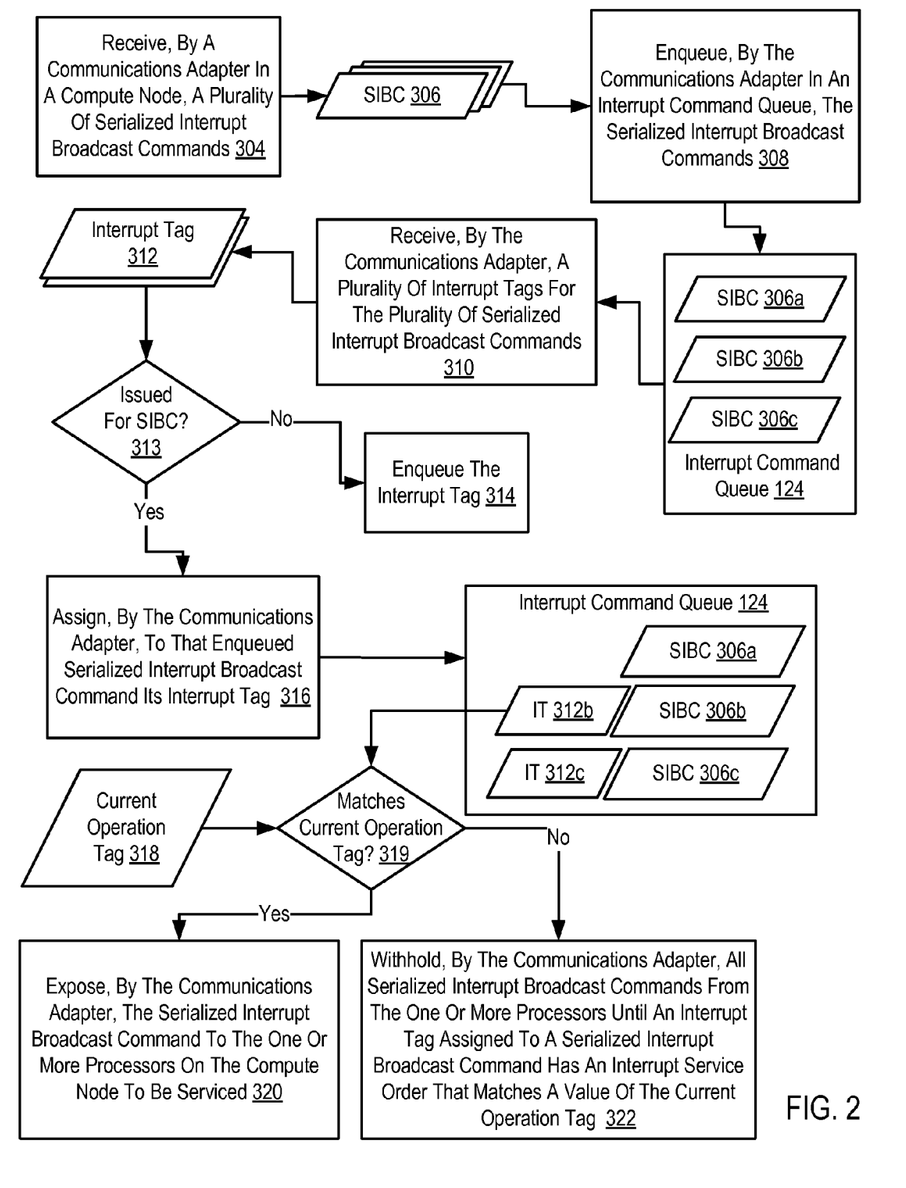
FIG. 2 sets forth a flow chart illustrating an example method of managing concurrent serialized interrupt broadcast commands in a multi-node, symmetric multiprocessing computer.

For further explanation, FIG. 2 sets forth a flow chart illustrating an example method of managing concurrent serialized interrupt broadcast commands in a multi-node, symmetric multiprocessing computer. The method of FIG. 2 is implemented by and upon a multi-node, symmetric multiprocessing computer (100) like the one illustrated and described above with reference to FIG. 1. The method of FIG. 2 is described here, therefore, with reference to both FIGS. 1 and 2, using reference numbers from each drawing. The computer of the method of FIG. 2 includes a plurality of compute nodes (202, 210, 206, 208, 210), each compute node comprising at least one processor (102) operatively coupled to a communications adapter (108), each communications adapter (108) coupled for data communications to communications adapters on other compute nodes.

The method of FIG. 2 includes receiving (204), by a communications adapter (108) in a compute node (202), a plurality of serialized interrupt broadcast commands (306). The plurality of serialized interrupt broadcasts may be received in any order without regard to the order in which the serialized interrupt broadcasts are issued.

Figure 3:
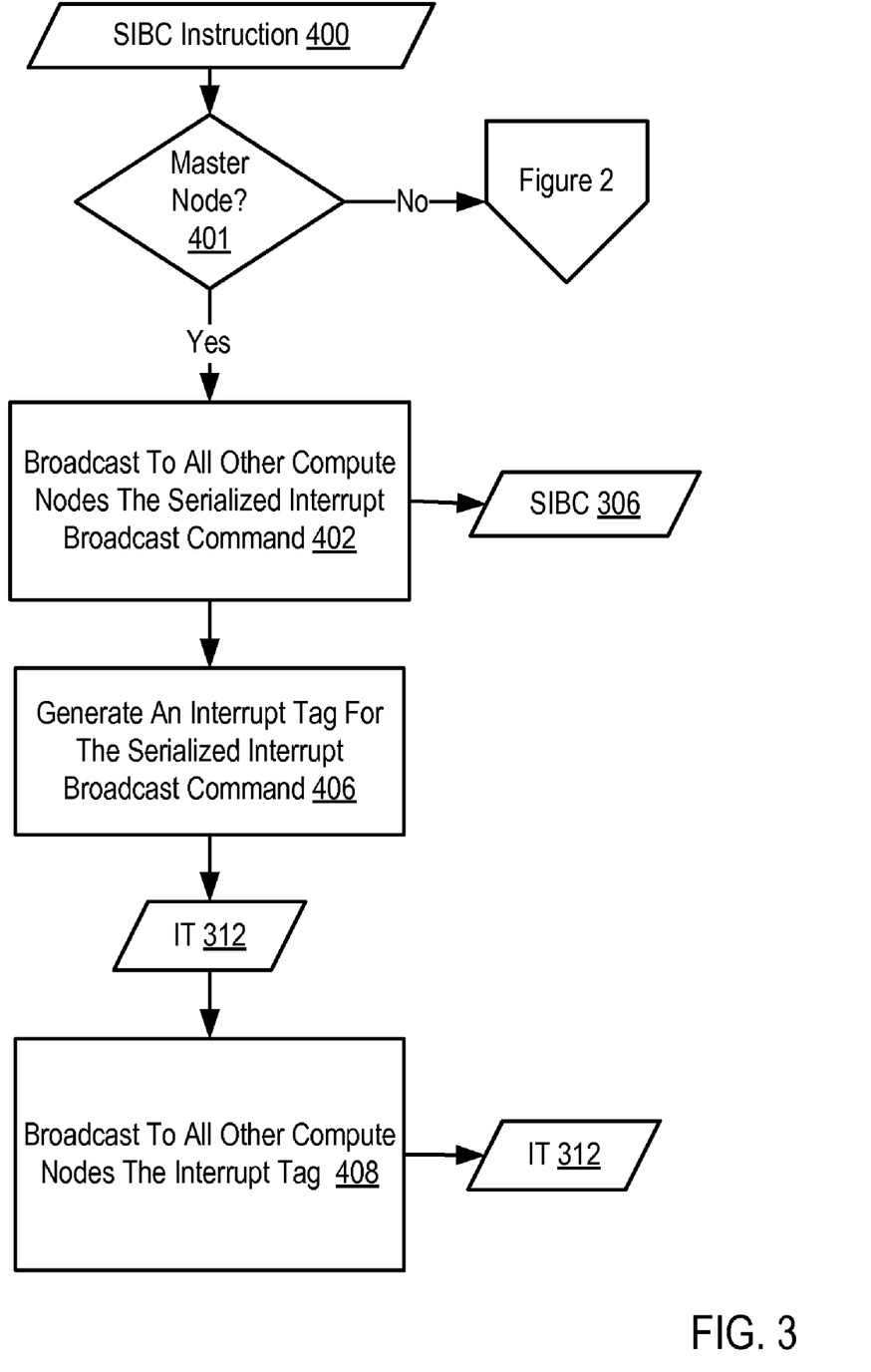
FIG. 3 sets forth a flow chart illustrating additional aspects of managing concurrent serialized interrupt broadcast commands according to embodiments of the present invention in which a serialized interrupt broadcast command is initiated by a processor on the master node.

The method of FIG. 2 also includes enqueuing (308), by the communications adapter (108) in an interrupt command queue (124), the serialized interrupt broadcast commands (306). In the example of FIG. 3, three serialized interrupt broadcast commands (303a, 306b, 306c) are illustrated in the interrupt command queue. This is for explanation and not for limitation. In fact, any number of serialized interrupt broadcast commands may be enqueued in the interrupt command queue and they may be enqueued in the interrupt command queue in any order.

The method of FIG. 2 also includes receiving (310), by the communications adapter (108), a plurality of interrupt tags (312) for the plurality of serialized interrupt broadcast commands (308), each interrupt tag (312) including an identification of an interrupt service order for a serialized interrupt broadcast command. The interrupt tags may be received in any order and may be received asynchronously from the serialized interrupt broadcast commands for which the interrupt tags are issued.

The method of FIG. 2 also includes determining (313), by the communications adapter (108) for each received interrupt tag (312), whether the interrupt tag (312) was issued for one of the serialized interrupt broadcast commands (306a, 306b, 306c) in the interrupt command queue (124). As mentioned, in some embodiments each node may issue only one serialized interrupt broadcast commands at a time and in such embodiments, determining (313) whether the interrupt tag (312) was issued for one of the serialized interrupt broadcast commands (306a, 306b, 306c) in the interrupt command queue (124) may be carried out by identifying an interrupt tag and serialized interrupt broadcast command having the same node ID. In alternative embodiments, a compute node may issue a serialized interrupt broadcast command before a previous serialized interrupt broadcast commands issued by the same node has been serviced, an in such embodiments, determining (313) whether the interrupt tag (312) was issued for one of the serialized interrupt broadcast commands (306a, 306b, 306c) in the interrupt command queue (124) may be carried out by identifying an interrupt tag and serialized interrupt broadcast command having the same unique ID for that particular serialized interrupt broadcast.

As mentioned, in still further embodiments, compute nodes may also have no restriction from issuing a new serialized interrupt broadcast command before the serialized interrupt broadcast command last issued by that compute node has been serviced on each compute node, and in such embodiments, interrupt tags may be implemented without a unique identification of the particular serialized interrupt broadcast command. Such embodiments include creating an interrupt command queue on every node for all other nodes in the SMP. Such an interrupt command queue for each node allows serialized interrupt broadcast commands to be enqueued and matched with interrupt tags based on the originating node rather than a unique identification of each serialized interrupt broadcast command if compute nodes launch commands to all other nodes in the same order.

If the received interrupt tag (312) was issued for a serialized interrupt broadcast command in the interrupt command queue (124), the method of FIG. 2 includes assigning, by the communications adapter (108), to that enqueued serialized interrupt broadcast command (306b, 306c) its interrupt tag (312b, 312c). Assigning, by the communications adapter (108), to that enqueued serialized interrupt broadcast command (306b, 306c) its interrupt tag (312b, 312c) may be carried out by concatenating the enqueued serialized interrupt broadcast command (306b, 306c) and its interrupt tag (312b, 312c).

If the received interrupt tag (312) was not issued for a serialized interrupt broadcast command in the interrupt command queue (124), the method of FIG. 2 includes enqueuing (314) the interrupt tag (312). In the method of FIG. 2, the interrupt tags may be enqueued in the interrupt command queue in any order without regard to the order in which the interrupt tags were generated and broadcast by the master node.

The method of FIG. 2 also includes determining (319), by the communications adapter (108), whether an interrupt tag (312b, 312c) assigned to a serialized interrupt broadcast command (306b, 306c) has an interrupt service order that matches a value of a current operation tag (318). Determining (319) whether an interrupt tag (312b, 312c) assigned to a serialized interrupt broadcast command (306b, 306c) has an interrupt service order that matches a value of a current operation tag (318) may be carried out by comparing the interrupt service order in the interrupt tag and the value of the current operation tag for a match.

If an interrupt tag (312b, 312c) assigned to a serialized interrupt broadcast command (306b, 306c) matches a current operation tag (318) that identifies the next serialized interrupt broadcast command to be exposed to the one or more processors, the method of FIG. 2 includes exposing (320), by the communications adapter (108), the serialized interrupt broadcast command to the one or more processors (102) on the compute node to be serviced. Exposing (320) the serialized interrupt broadcast command to the one or more processors (102) on the compute node to be serviced may be carried out by setting an interrupt vector (126) to a value for the serialized interrupt broadcast command. In the example of FIGS. 1 and 2, each of the processors (102) is capable of observing the interrupt vector (126) and, upon observation of a value of the vector identifying a serialized interrupt broadcast command, each of the processors may service the serialized interrupt broadcast command.

If no interrupt tag assigned to a serialized interrupt broadcast commands matches a current operation tag, the method of FIG. 2 includes withholding (322), by the communications adapter (108), all serialized interrupt broadcast commands from the one or more processors (102) until an interrupt tag assigned to a serialized interrupt broadcast commands matches a current operation tag (318). Withholding (322), by the communications adapter (102), all serialized interrupt broadcast commands (306) from the one or more processors (102) until an interrupt tag (312) assigned to a serialized interrupt broadcast command has an interrupt service order that matches a value of the current operation tag (318).

As mentioned above, the compute node assigned as the master node generates and broadcasts the interrupt tags for use by all the nodes to ensure that serialized interrupt broadcast commands are serviced in the proper order. For further explanation, FIG. 3 sets forth a flow chart illustrating additional aspects of managing concurrent serialized interrupt broadcast commands according to embodiments of the present invention in which a serialized interrupt broadcast command is initiated by a processor on the master node. The method of FIG. 3 is described here with reference to both FIGS. 1 and 3 using reference numbers from each drawing. Responsive to a processor (102) on a compute node (202, 204, 206, 208, 210) issuing an instruction (400) to broadcast a serialized interrupt broadcast command (400), the method of FIG. 3 includes determining (401), by the communications adapter (108) on the compute node, whether the compute node has been assigned as a master node. If the compute node has not been assigned as the master node the method continues with the method of FIG. 2 as described above.

If the compute node has been assigned as the master node, the method of FIG. 3 includes broadcasting (402) to all other compute nodes the serialized interrupt broadcast command (306). Broadcasting (402) to all other compute nodes the serialized interrupt broadcast command (306) includes transmitting to each of the other nodes the serialized interrupt broadcast command (306).

The method of FIG. 3 also includes generating (406) an interrupt tag (312) for the serialized interrupt broadcast command and broadcasting (408) to all other compute nodes the interrupt tag (312). As mentioned, the interrupt tag includes an identification of a next position in an interrupt service order for the serialized interrupt broadcast command and an identification of the node that issued the serialized interrupt broadcast command for the interrupt tag. The interrupt tag only identifies the compute node that issued the serialized interrupt broadcast command in embodiments that restrict compute nodes from issuing a new serialized interrupt broadcast command before the serialized interrupt broadcast command last issued by that compute node has been serviced on each compute node. In embodiments where there is no such restriction, interrupt tags may also include a serialized interrupt broadcast command identification that uniquely identifies that particular serialized interrupt broadcast command. In some embodiments of the present invention, broadcasting the serialized interrupt broadcast command and broadcasting the interrupt tag are carried out in a single broadcast.

As mentioned, in still further embodiments, compute nodes may also have no restriction from issuing a new serialized interrupt broadcast command before the serialized interrupt broadcast command last issued by that compute node has been serviced on each compute node, and in such embodiments, interrupt tags may be implemented without a unique identification of the particular serialized interrupt broadcast command. Such embodiments include creating an interrupt command queue on every node for all other nodes in the SMP. Such an interrupt command queue for each node allows serialized interrupt broadcast commands to be enqueued and matched with interrupt tags based on the originating node rather than a unique identification of each serialized interrupt broadcast command if compute nodes launch commands to all other nodes in the same order.

Figure 4:
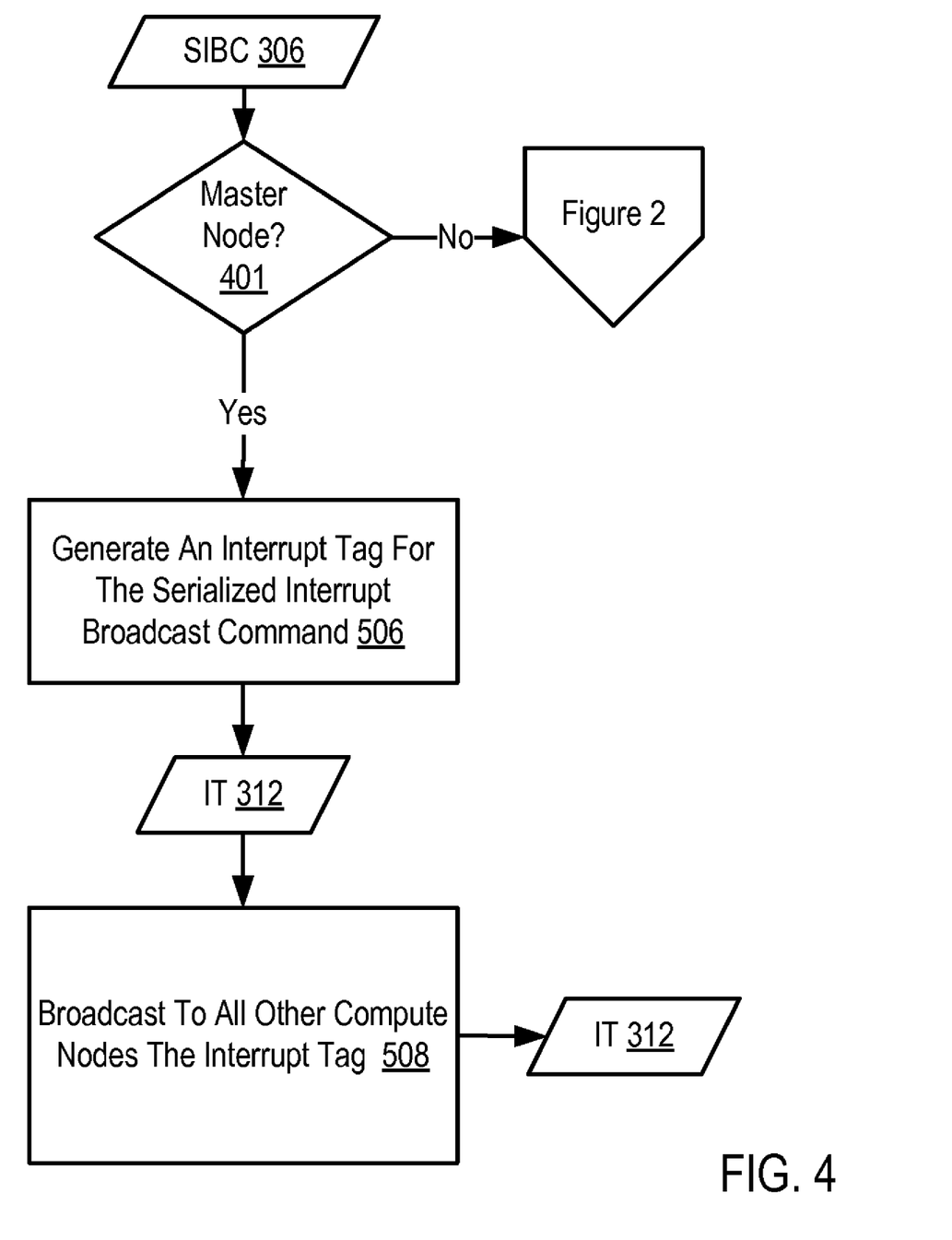
FIG. 4 sets forth a flow chart illustrating additional aspects of managing concurrent serialized interrupt broadcast commands according to embodiments of the present invention when a serialized interrupt broadcast command is initiated from a node that is not the master node.

Not all serialized interrupt broadcast commands according to the present invention are initiated from the master node. For further explanation, FIG. 4 sets forth a flow chart illustrating additional aspects of managing concurrent serialized interrupt broadcast commands according to embodiments of the present invention when a serialized interrupt broadcast command is initiated from a compute node that is not the master node. Responsive to receiving a serialized interrupt broadcast command (306) issued on another node, the method of FIG. 4 includes determining (401), by a communications adapter on the node receiving the serialized interrupt broadcast command, whether the compute node has been assigned as a master node. If the compute node has not been assigned as the master node, the method of FIG. 4 proceeds with the method of FIG. 2 as described above. If the compute node has been assigned as the master node, the method of FIG. 4 includes generating (506) an interrupt tag for the serialized interrupt broadcast command (306) and broadcasting (508) to all other nodes the interrupt tag (312).

Example embodiments of the present invention are described largely in the context of a fully functional computer system for managing concurrent serialized interrupt broadcast commands in a multi-node, SMP computer. Readers of skill in the art will recognize, however, that the present invention also may be embodied in a computer program product disposed upon computer readable storage media for use with any suitable data processing system, such as, for example, the computer readable media illustrated as an optical disk (60) on FIG. 5. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, that is as apparatus, or as a method or a computer program product. Accordingly, aspects of the present invention may take the form of an entirely hardware embodiment, embodiments that are at least partly software (including firmware, resident software, micro-code, etc.), with embodiments combining software and hardware aspects that may generally be referred to herein as a "circuit," "module," "apparatus," or "system." Furthermore, aspects of the present invention may take the form of a computer program product embodied in one or more computer readable media (e.g., optical disk (60) on FIG. 5) having computer readable program code embodied thereon.

Any combination of one or more computer readable media may be utilized. A computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 5:
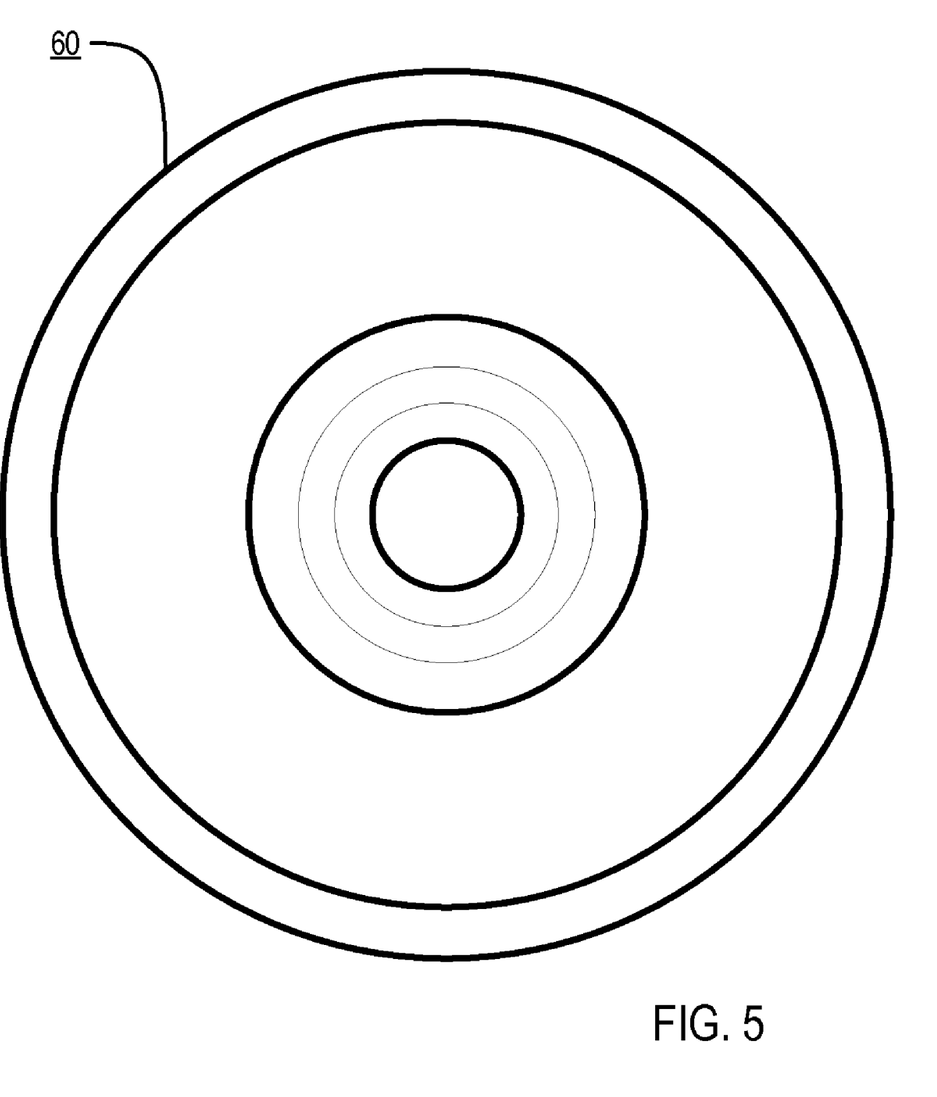
FIG. 5 illustrates an example form of computer readable media bearing program code which executable on a multi-node SMP computer, an article of manufacture that is a computer program product according to embodiments of the present invention.

These computer program instructions may also be stored in a computer readable medium that can direct a computer, other programmable data processing apparatus, or other devices to function in a particular manner, such that the instructions stored in the computer readable medium produce an article of manufacture (e.g., optical disk (60) on FIG. 5) including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in a flowchart or block diagram may represent a module, segment, or portion of code or other automated computing machinery, which comprises one or more executable instructions or logic blocks for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of managing concurrent serialized interrupt broadcast commands in a multi-node, symmetric multiprocessing computer, the computer comprising a plurality of compute nodes, each compute node comprising at least one processor operatively coupled to a communications adapter, each communications adapter coupled for data communications to communications adapters on other compute nodes, the method comprising:

receiving, by a communications adapter in a compute node, a plurality of serialized interrupt broadcast commands;

receiving, by the communications adapter, a plurality of interrupt tags for the plurality of serialized interrupt broadcast commands, each interrupt tag including an identification of an interrupt service order for a serialized interrupt broadcast command;

assigning, by the communications adapter, to each serialized interrupt broadcast command its interrupt tag; and if an interrupt tag assigned to a serialized interrupt broadcast command has an interrupt service order that matches a value of a current operation tag that identifies the next serialized interrupt broadcast command to be exposed to the one or more processors, exposing, by the communications adapter, the serialized interrupt broadcast command to the one or more processors on the compute node to be serviced.

2. The method of claim 1 further comprising withholding, by the communications adapter, all serialized interrupt broadcast commands from the one or more processors until an interrupt tag assigned to a serialized interrupt broadcast command has an interrupt service order that matches a value of the current operation tag.

3. The method of claim 1 further comprising enqueuing the interrupt tag if the received interrupt tag was not issued for a serialized interrupt broadcast commands in the queue.

4. The method of claim 1 further comprising:
responsive to a processor on a compute node issuing an instruction to broadcast a serialized interrupt broadcast command, determining, by the communications adapter on the compute node, whether the compute node has been assigned as a master node; and
if the compute node has been assigned as the master node:
broadcasting to all other compute nodes the serialized interrupt broadcast command; and
generating an interrupt tag for the serialized interrupt broadcast command and broadcasting to all other compute nodes the interrupt tag.

5. The method of claim 1 further comprising:
responsive to receiving a serialized interrupt broadcast command issued on another node, determining, by a communications adapter on the node receiving the serialized interrupt broadcast command, whether the compute node has been assigned as a master node; and
if the compute node has been assigned as the master node:
generating an interrupt tag for the serialized interrupt broadcast command and broadcasting to all other nodes the interrupt tag.

6. The method of claim 1 wherein exposing, by the communications adapter, the serialized interrupt broadcast command to the one or more processors on the compute node to be serviced further comprises setting an interrupt vector for the one or more processors.

7. A multi-node, symmetric multiprocessing computer configured to managing concurrent serialized interrupt broadcast commands, the computer comprising a plurality of compute nodes, each compute node comprising at least one processor operatively coupled to a communications adapter, each communications adapter coupled for data communications to communications adapters on other compute nodes, each communication adapter configured to function by:
receiving a plurality of serialized interrupt broadcast commands;
receiving a plurality of interrupt tags for the plurality of serialized interrupt broadcast commands, each interrupt tag including an identification of an interrupt service order for a serialized interrupt broadcast command;
assigning to each serialized interrupt broadcast command its interrupt tag; and
if an interrupt tag assigned to a serialized interrupt broadcast command has an interrupt service order that matches a value of a current operation tag that identifies the next serialized interrupt broadcast command to be exposed to the one or more processors, exposing the serialized interrupt broadcast command to the one or more processors on the compute node to be serviced.

8. The computer of claim 7 wherein each communication adapter is configured to function by withholding, by the communications adapter, all serialized interrupt broadcast commands from the one or more processors until an interrupt tag assigned to a serialized interrupt broadcast command has an interrupt service order that matches a value of the current operation tag.

9. The computer of claim 7 wherein each communication adapter is configured to function by enqueuing the interrupt tag if the received interrupt tag was not issued for a serialized interrupt broadcast commands in the queue.

10. The computer of claim 7 wherein each communication adapter is configured to function by:
responsive to a processor on a compute node issuing an instruction to broadcast a serialized interrupt broadcast command, determining whether the compute node has been assigned as a master node; and
if the compute node has been assigned as the master node:
broadcasting to all other compute nodes the serialized interrupt broadcast command; and
generating an interrupt tag for the serialized interrupt broadcast command and broadcasting to all other compute nodes the interrupt tag.

11. The computer of claim 7 wherein each communication adapter is configured to function by:
responsive to receiving a serialized interrupt broadcast command issued on another node, determining whether the compute node has been assigned as a master node; and
if the compute node has been assigned as the master node:
generating an interrupt tag for the serialized interrupt broadcast command and broadcasting to all other nodes the interrupt tag.

12. The computer of claim 7 wherein exposing the serialized interrupt broadcast command to the one or more processors on the compute node to be serviced further comprises setting an interrupt vector for the one or more processors.

13. A computer program product for managing concurrent serialized interrupt broadcast commands in a multi-node, symmetric multiprocessing computer, the computer comprising a plurality of compute nodes, each compute node comprising at least one processor operatively coupled to a communications adapter, each communications adapter coupled for data communications to communications adapters on other compute nodes, the computer program product disposed upon a computer readable storage medium, the computer program product comprising computer program instructions which when executed by the communications adapters function by
receiving, by a communications adapter in a compute node, a plurality of serialized interrupt broadcast commands;
receiving, by the communications adapter, a plurality of interrupt tags for the plurality of serialized interrupt broadcast commands, each interrupt tag including an identification of an interrupt service order for a serialized interrupt broadcast command;
assigning, by the communications adapter, to each serialized interrupt broadcast command its interrupt tag; and
if an interrupt tag assigned to a serialized interrupt broadcast command has an interrupt service order that matches a value of a current operation tag that identifies the next serialized interrupt broadcast command to be exposed to the one or more processors, exposing, by the communications adapter, the serialized interrupt broadcast command to the one or more processors on the compute node to be serviced.

14. The computer program product of claim 13 further comprising computer program instructions which when executed by the communications adapters function by withholding, by the communications adapter, all serialized interrupt broadcast commands from the one or more processors until an interrupt tag assigned to a serialized interrupt broadcast command has an interrupt service order that matches a value of the current operation tag.

15. The computer program product of claim 13 further comprising computer program instructions which when executed by the communications adapters function by enqueuing the interrupt tag if the received interrupt tag was not issued for a serialized interrupt broadcast commands in the queue.

16. The computer program product of claim 13 further comprising computer program instructions which when executed by the communications adapters function by:

responsive to a processor on a compute node issuing an instruction to broadcast a serialized interrupt broadcast command, determining whether the compute node has been assigned as a master node; and if the compute node has been assigned as the master node:

broadcasting to all other compute nodes the serialized interrupt broadcast command; and generating an interrupt tag for the serialized interrupt broadcast command and broadcasting to all other compute nodes the interrupt tag.

17. The computer program product of claim 13 further comprising computer program instructions which when executed by the communications adapters function by:

responsive to receiving a serialized interrupt broadcast command issued on another node, determining whether the compute node has been assigned as a master node; and if the compute node has been assigned as the master node:
generating an interrupt tag for the serialized interrupt broadcast command and broadcasting to all other nodes the interrupt tag.

18. The computer program product of claim 13 wherein exposing, by the communications adapter, the serialized interrupt broadcast command to the one or more processors on the compute node to be serviced further comprises setting an interrupt vector for the one or more processors.

* * * * *